Patented Sept. 3, 1946

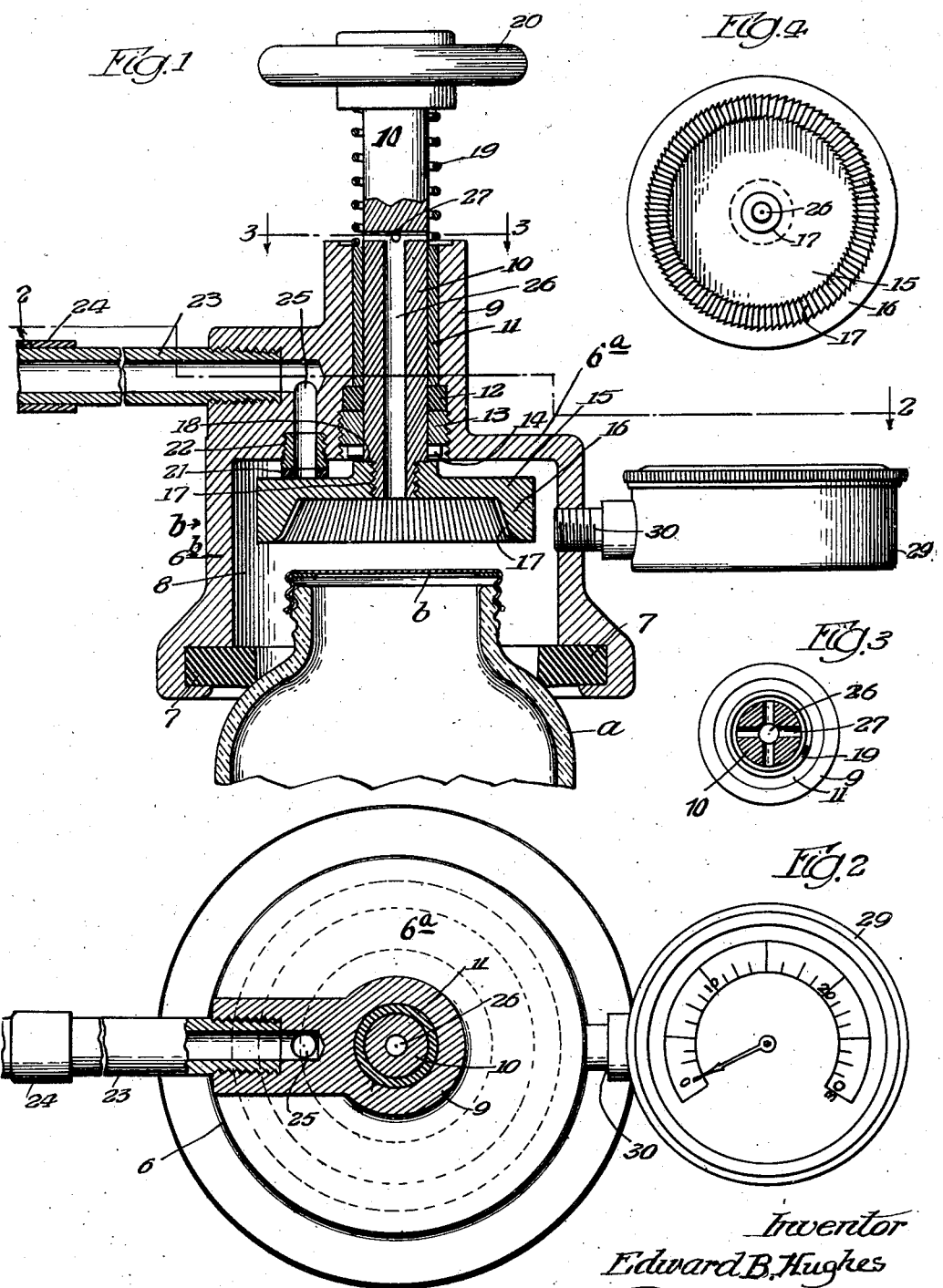

2,406,771

UNITED STATES PATENT OFFICE 2,406,771

DEVICE FOR VACUUM SEALING CONTAINERS

Edward B. Hughes, Evansville, Ind., assignor to Bernardin Bottle Cap Co., Inc., Evansville, Ind., a corporation of Indiana Application August 19, 1944, Serial No. 550,177

5 Claims. (Cl. 226—82)

The invention relates to devices for vacuum sealing containers provided with screw-caps.

One object of the invention is to provide a simple device for expeditiously vacuum sealing containers provided with screw-caps.

Another object of the invention is to provide a simple and efficient portable manually operable device for vacuum sealing containers.

Other objects of the invention will appear from the detailed description.

The invention consists in the several novel features hereinafter set forth and more particularly defined by claims at the conclusion hereof.

In the drawing:

Fig. 1 is a vertical central section of a device embodying the invention, parts being shown in elevation.

Fig. 2 is a horizontal section taken on line 2—2 of Fig. 1.

Fig. 3 is a section taken on line 3—3 of Fig. 1.

Fig. 4 is an inverted plan view of the chuck for gripping the screw cap for rotation on the container.

The device comprises an inverted cup-shaped housing 6 in which is formed a chamber 8, the lower end of which is open to receive the container to be sealed. The lower end of the housing is provided with an elastic annulus or ring 7, for example of soft rubber, and, when the housing is manually pressed downwardly and is seated onto the container, the chamber 8 in the housing will be seated to prevent the admission of air to the chamber 8 when the latter is vacuumized. In vacuum sealing jars $a$ provided with a screw-cap $b$ the cap is loosely placed or partially screwed onto the neck of the filled container or jar to permit air to be exhausted from the jar through the cap. The housing 6 is pressed tightly onto the jar so that the ring 7 will form a seal between the housing and the jar. The housing 6 comprises a top 6a, and a depending cylindrical portion 6b, and is formed with an integral upward tubular extension 9. A cylindrical stem 10 is slidably mounted in a bushing 11 which is fixed in extension 9 and is slidable and rotatable relatively to the housing in said bushing. A packing ring 12 is held in the extension 9 by a gland 13 which is screw-threaded into the inner face of the top 6a of the housing 6 to form an air-seal between the stem 10 and the housing. Gland 13 is provided with lugs 14 whereby it may be rotated to compress the packing 12 from the inside of the housing.

A chuck for engaging the cap for rotating it onto the jar while the chamber 8 is under vacuum comprises a body 15 and an integral depending annular rim 16, the inner periphery of which is tapered upwardly and provided with teeth 17 which, when pressed into engagement with the cap, are adapted upon rotation of the chuck to rotate the cap $b$ into sealed relation with the jar $a$. The chuck is screw-threaded, as at 17, to the lower end of stem 10 which is provided with a shoulder 18 engaged by the body of the chuck so that it can be interchanged with chucks of different sizes or shapes. The toothed downwardly flared inner periphery of the rim 16 adapts the chuck for gripping caps of somewhat varying diameters.

The stem 10 and chuck are normally pressed upwardly by a coil spring 19 interposed between the upper end of extension 9 and a hand wheel 20 fixedly secured to the upper end of stem 10. Hand wheel 20 is adapted for manual depression and slidably shifting the stem 10 and the chuck downwardly to force the teeth 17 into engagement with the cap $b$ on the jar $a$ and also for rotation of the stem 10 for turning the chuck to rotate the cap onto the jar.

The chuck is adapted to control the application of vacuum to chamber 8. The spring 19 normally holds the upper face of the body 15 of the chuck seated against an elastic ring 21 which is secured to a nipple 22 which is screw-threaded into the top wall of the housing. A vacuum connection comprises a rigid pipe-section 23 which is connected by a flexible pipe 24 to a vacuum tank or other suitable source of vacuum. Pipe 23 is communicatively connected with the chamber 8 for vacuumizing chamber 8 by an angular duct 25 formed in the top of the housing. The vertical branch of duct 25 extends through nipple 22 and the elastic washer 21. The duct 25 is normally closed by the engagement of the top face of chuck body 15 with the annular washer 21 so that while the chuck is in its normal or raised position the vacuum will be cut off from chamber 8. The chuck is held firmly seated against washer 21 to prevent leakage into the duct 25 by the upward force exerted by spring 19. The rigid pipe section 23 is adapted to be gripped by one hand of the operator while the other hand grips the hand wheel 20 for conveniently manipulating the housing into and out of operative relation with the jar $a$ and during the vacuumizing operations.

The chamber 8, when the vacuum is cut off by the chuck and while the housing has been pressed into sealed relation with the body of the jar, is open to atmosphere through a central duct 26 in the stem 10 and cross ducts 27 communicating with duct 26 and atmosphere when the stem 10 is in its raised position. This connection to atmosphere is closed during the initial downward movement of the chuck 15, stem 10 and hand-wheel 20 when ducts 27 pass into the extension 9 of the housing and is automatically opened when the chuck is raised against ring 21.

An upwardly facing vacuum gauge 29 is supported on the housing 6 and is communicatively connected by a hollow stem or pipe-section 30 with the chamber 8 for indicating the vacuum pressure in said chamber. This gauge is disposed at one side of the housing where it can be easily read during the vacuumizing operations.

The operation of the device will be as follows: The operator, by gripping pipe-section 23 and hand-wheel 20, places the housing 6 around the neck of the jar $a$ so that the elastic ring 7 will be seated on the jar-body below the neck. The hand-wheel 20 will be depressed against the force of spring 19 which will, through stem 10, lower the chuck and initially close the cross-ports 27 to cut off communication between chamber 8 and atmosphere and simultaneously depress the chuck to connect the vacuum-duct 25 to chamber 8 as the chuck moves away from its seat on elastic ring 21. The chamber 8 will then be vacuumized. The jar $a$ will also be vacuumized through the loose connection between the cap $b$ and the jar. As the chamber 8 is vacuumized the degree of vacuum will be indicated by the gauge 29. When the vacuum has increased to the degree desired, as indicated by gauge 29, the operator will rotate the hand-wheel 20 which, through stem 10, will rotate the chuck 15 while its teeth 17 are pressed against the cap $b$ until the cap is firmly seated and sealed on the jar $a$. The operator will then release the hand-wheel 20 and the spring 19 will lift the chuck off the cap and automatically close the vacuum duct 25. As the chuck approaches its seated position on the elastic ring 21, ports 27 in stem 10 will be opened to atmosphere to break the vacuum in the chamber 8. The device can then be readily lifted off the sealed jar.

The upper face of chuck 15 and the elastic seat 21 in the housing exemplify valve-means which is operable by the chuck for controlling the suction connection between chamber 8 and duct 25 for vacuumizing the container before the screw-cap is sealed thereon. The duct 26 in stem 10 and cross-ports 27 exemplify valve-means operable by the handle 20 and stem 10 which operate the chuck for connecting chamber 8 to atmosphere when the vacuum connection is closed to release the housing for removal from the container. The spring 19 exemplifies spring-means for automatically shifting the valve-means for controlling the vacuum and the valve-means for admitting atmospheric air to chamber 8 when the handle 20 is released at the end of each vacuumizing operation. The construction described makes it possible to expedite the vacuumizing operations.

The invention exemplifies a manually operable portable vacuum sealing device which is simple in construction and efficient in operation. The device can be easily and quickly manipulated onto and off the jar and the cap secured onto the jar while the jar is under vacuum. The release of the hand-wheel automatically cuts off the vacuum from the chamber in which the upper portion of the jar is confined and also opens said chamber to atmosphere.

The invention is not to be understood as restricted to the details set forth, since these may be modified within the scope of the appended claims without departing from the spirit and scope of the invention.

Having thus described the invention, what I claim as new and desire to secure by Letters Patent is:

1. In a device for sealing a screw-cap container having a reduced threaded neck and a shoulder beneath the neck, the combination of a portable inverted cup-shaped housing provided with a chamber adapted to receive the neck with a cap thereon, and means for sealing the housing on the shoulder, a chuck in said chamber for gripping, for rotation, a screw-cap on the container while said chamber is under vacuum, a stem on the chuck extending upwardly through and slidable and rotatable in the top of the housing, a handle on the stem whereby the chuck may be slidably shifted and rotated, a vacuum duct in the housing for vacuumizing said chamber and container, a nipple at the terminal of the vacuum duct at said chamber, an elastic seat on said nipple and engageable by the raised chuck for cutting off vacuum from said chamber, spring-means for pressing the chuck into raised position, and a duct in the stem communicatively connected to said chamber and to atmosphere and positioned to be closed by the housing when the chuck is depressed to vacuumize said chamber.

2. In a device for sealing a screw-cap container having a reduced threaded neck and a shoulder beneath the neck, the combination of a portable cup-shaped housing provided with a chamber adapted to receive the neck with a cap thereon, and means for sealing the housing on the shoulder, a chuck in said chamber for gripping a screw-cap for rotation on the container while said chamber is under vacuum, a stem on the chuck extending upwardly through and slidable and rotatable in the top of the housing, a handle on the stem whereby the chuck may be slidably shifted and rotated, a vacuum duct in the housing having a terminal at the chamber adapted for closure by the raised chuck, spring-means for pressing the chuck, stem and handle into raised position and closing said terminal by the chuck, and a central longitudinal duct in the stem communicatively connected to said chamber and cross-ports communicatively connected to atmosphere and positioned immediately above the top of the housing for closure by the housing when the chuck is depressed to vacuumize said chamber.

3. In a device for sealing a screw-cap container having a reduced threaded neck and a shoulder beneath the neck, the combination of a portable inverted cup-shaped housing provided with a chamber adapted to receive the neck with a cap thereon and means for sealing the housing on the shoulder of the container; a chuck in the chamber for engaging and gripping the cap for rotation on the neck; a stem rigid with the chuck and slidably and rotatably mounted in the top of the housing, manually operable handle on the stem for slidably shifting and rotating the chuck; a vacuum line connected to the housing for exhausting air from the chamber and the container, and valve-means, operable by the movement of the chuck and stem, for controlling the vacuum in and the flow of atmospheric air to and from said chamber.

4. In a device for sealing a screw-cap container having a reduced threaded neck and a shoulder beneath the neck, the combination of a portable inverted cup-shaped housing provided with a chamber adapted to receive the neck with a cap thereon and means for sealing the housing on the shoulder of the container; a chuck in the chamber for engaging and gripping the cap for rotation on the neck; a stem rigid with the chuck and slidably and rotatably mounted in the top of the housing, a manually operable handle on the stem for slidably shifting and rotating the chuck; spring-means for retracting the stem and chuck; a vacuum line connected to the housing for exhausting air from the chamber and the container; and valve-means, operable by the movement of the chuck and stem, for exhausting air from, and the flow of atmospheric air to and from said chamber, said spring-means being adapted to retract the chuck, handle and stem, and operate the valve-means to cut off the vacuum from and to admit air into said chamber.

5. In a device for sealing a screw-cap container having a reduced threaded neck and a shoulder beneath the neck, the combination of a portable inverted cup-shaped housing provided with a chamber adapted to receive the neck with a cap thereon and means for sealing the housing on the shoulder of the container; a chuck in the chamber for engaging and gripping the cap for rotation on the neck; a stem rigid with the chuck and slidably and rotatably mounted in the housing and provided with a duct through which air can flow into the chamber; a manually operable handle on the upper end of the stem; a spring for retracting the stem and chuck; a vacuum line connected to the housing for exhausting air from the chamber and the container; valve-means, operable by the movement of the chuck and between the chuck and the housing for controlling the vacuum line to said chamber; and means between the stem and the housing controlled by the movement of the stem for controlling the flow of air through said duct to and from said chamber.

EDWARD B. HUGHES.